US011475082B1

(12) United States Patent
Beard et al.

(10) Patent No.: US 11,475,082 B1
(45) Date of Patent: Oct. 18, 2022

(54) SYSTEMS AND METHODS FOR CONTEXT-BASED KEYWORD SEARCHING

(71) Applicant: Palantir Technologies Inc., Palo Alto, CA (US)

(72) Inventors: Mitchell Beard, Falls Church, VA (US); Jeffrey Bagdis, Arlington, VA (US); Christopher Brahms, San Diego, CA (US); Ashley Einspahr, Palo Alto, CA (US); Clare Adrien, Palo Alto, CA (US); Arvind Raju, Orlando, FL (US); Matthew Elkherj, Palo Alto, CA (US)

(73) Assignee: Palantir Technologies Inc., Palo Alto, CA (US)

( * ) Notice: Subject to any disclaimer, the term of this patent is extended or adjusted under 35 U.S.C. 154(b) by 602 days.

(21) Appl. No.: 15/928,855

(22) Filed: Mar. 22, 2018

Related U.S. Application Data

(60) Provisional application No. 62/599,477, filed on Dec. 15, 2017.

(51) Int. Cl.
*G06F 16/24* (2019.01)
*G06F 16/9535* (2019.01)
*G06F 16/248* (2019.01)

(52) U.S. Cl.
CPC ........ *G06F 16/9535* (2019.01); *G06F 16/248* (2019.01)

(58) Field of Classification Search
CPC . G06F 16/3322; G06F 16/9535; G06F 16/248
See application file for complete search history.

(56) References Cited

U.S. PATENT DOCUMENTS

| | | |
|---|---|---|
| 6,980,984 B1 | 12/2005 | Huffman et al. |
| 7,657,540 B1 | 2/2010 | Bayliss |
| 7,899,796 B1 | 3/2011 | Borthwick et al. |
| 7,900,052 B2 | 3/2011 | Jonas |
| 9,235,654 B1 * | 1/2016 | Gupta ............... G06F 16/90324 |
| 9,348,920 B1 | 5/2016 | Kesin |
| 2002/0083039 A1 | 6/2002 | Ferrari |
| 2007/0130206 A1 | 6/2007 | Zhou et al. |
| 2008/0071731 A1 | 3/2008 | Ma et al. |
| 2009/0024589 A1 | 1/2009 | Sood et al. |
| 2010/0114887 A1 | 5/2010 | Conway et al. |

(Continued)

FOREIGN PATENT DOCUMENTS

EP 3037992 6/2016

*Primary Examiner* — Mohammad S Rostami
(74) *Attorney, Agent, or Firm* — Sheppard Mullin Richter & Hampton LLP

(57) ABSTRACT

Systems and methods are provided for performing context-based keyword searching using a search bar. Based on search terms received via the search bar, the system may be configured to provide suggested search parameters to associate with that search term. The suggested search parameters may each include a type of data and/or a filter to associate with the search term (e.g., name, phone number, date of birth, etc.). The one or more suggested search parameters may be identified based on the search term itself, a list of possible types of data or filters, a preliminary search of one or more datasets, a record of one or more previous searches performed, requirements associated with one or more searchable datasets, the format of user input received via the search bar, and/or one or more other factors.

21 Claims, 7 Drawing Sheets

(56) References Cited

U.S. PATENT DOCUMENTS

| | | | |
|---|---|---|---|
| 2011/0258190 A1 | 10/2011 | Chen et al. | |
| 2012/0047134 A1* | 2/2012 | Hansson | G06Q 30/0275 707/731 |
| 2012/0159312 A1 | 6/2012 | Mital et al. | |
| 2012/0278273 A1 | 11/2012 | Fang | |
| 2013/0304770 A1 | 11/2013 | Boero et al. | |
| 2014/0195519 A1* | 7/2014 | Holt | G06F 16/3322 707/722 |
| 2014/0330845 A1 | 11/2014 | Feldschuh | |
| 2014/0358940 A1* | 12/2014 | Gupta | G06F 16/285 707/748 |
| 2014/0379755 A1 | 12/2014 | Kuriakose et al. | |
| 2015/0006564 A1* | 1/2015 | Tomkins | G06F 16/3322 707/767 |
| 2015/0269163 A1* | 9/2015 | Sun | G06F 16/24578 707/728 |
| 2016/0063006 A1* | 3/2016 | Belogolov | G06F 16/3322 707/767 |
| 2017/0068683 A1* | 3/2017 | Bakshi | G06F 16/245 |
| 2017/0091343 A1* | 3/2017 | Shorina | G06F 16/242 |
| 2017/0185681 A1* | 6/2017 | Myltsev | G06F 16/951 |
| 2018/0075095 A1* | 3/2018 | Srivastava | G06F 16/213 |
| 2018/0081989 A1* | 3/2018 | Nakao | G06F 16/9535 |
| 2018/0089212 A1* | 3/2018 | Deutsch Peled | G06F 16/9535 |
| 2018/0349472 A1* | 12/2018 | Kohlschuetter | G06F 16/3322 |
| 2019/0108235 A1* | 4/2019 | Zheng | G06F 16/90324 |
| 2019/0114363 A1* | 4/2019 | Cheng | G06F 16/9535 |
| 2019/0163768 A1* | 5/2019 | Gulati | G06F 16/9535 |
| 2019/0179921 A1* | 6/2019 | Manoharan | A63F 13/85 |

\* cited by examiner

SYSTEMS AND METHODS FOR CONTEXT-BASED KEYWORD SEARCHING

CROSS REFERENCE TO RELATED APPLICATIONS

This application claims the benefit under 35 U.S.C. § 119(e) of U.S. Provisional Application Ser. No. 62/599,477, filed Dec. 15, 2017, the content of which is incorporated by reference in its entirety into the present disclosure.

TECHNICAL FIELD

This disclosure relates to approaches for facilitating and performing keyword searching.

BACKGROUND

Each conventional approach to searching based on keywords may suffer from one or more drawbacks. When searching using a single search bar, the search terms typically lack context. In other words, the search may be performed without knowledge of the type of data referred to by each search term, resulting in the return of less relevant search results. Without that knowledge, the search bar is also unable to determine the types of data that may be missing for data sources that have search parameter requirements. For example, a given data source may require that at least two types of data (e.g., a name and an address) are provided in order to perform a search of that data source. Search forms may provide a solution to the issue of missing search parameters, but they too suffer from one or more drawbacks. For example, search forms may lack the simplicity of use associated with a single search bar, may require that a user specify a single data source in which to search, and/or may require more search terms than are necessary to search a single data source in order to search multiple data sources simultaneously. Requiring numerous search terms to perform a search often reduces the number of search results (by only returning search results that contain each of the search terms), thus forcing the user to limit the breadth of their search and potentially miss results expected by the user. These and other drawbacks exist with conventional solutions.

SUMMARY

A claimed solution rooted in computer technology overcomes problems specifically arising in the realm of computer technology. Various embodiments of the present disclosure may include systems, methods, and non-transitory computer readable media configured to perform context-based keyword searching using a search bar. Using a search bar, a user may provide a search term. Based on the search term, the system may be configured to provide a suggestion of one or more search parameters that may be associated with that search term. For example, a drop-down menu may be provided from the search bar indicating suggested search parameters for that search term. The one or more suggested search parameters may each include a type of data and/or a filter to associate with the search term (e.g., name, phone number, date of birth, etc.). In some implementations, suggestions may be determined by comparing a search term to information of one or more data sources, predefined formats associated with one or more types of data, and/or a record of search terms previously associated with one or more search parameters and/or one or more types of data or filters. Based on the suggested search parameters identified for one or more search terms entered into the search bar, an indication of the one or more data sources that may be searched using those suggested search parameters may be provided. For example, each of the data sources that may be searched using the search bar may be associated with one or more required search parameters.

These and other features of the systems, methods, and non-transitory computer readable media are disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention(s).

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention(s) are utilized, and the accompanying drawings of which:

DETAILED DESCRIPTION

A claimed solution rooted in computer technology overcomes problems specifically arising in the realm of computer technology. It will be appreciated by those having skill in the art that the implementations described herein may be practiced without these specific details or with an equivalent arrangement. In other instances, well-known structures and devices are shown in block diagram form to avoid unnecessarily obscuring the implementations.

Figure 1:
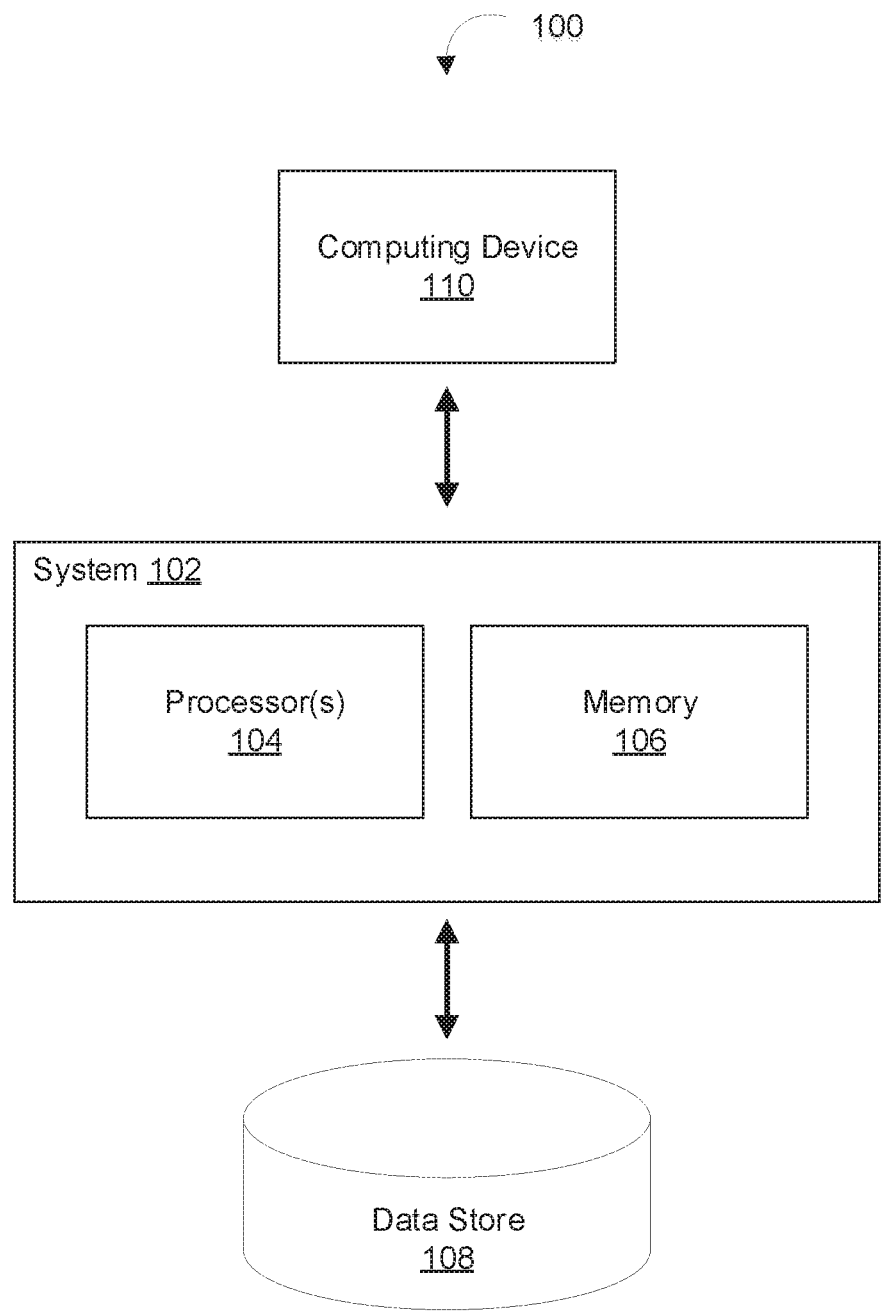
FIG. 1 depicts a diagram of an example of a system for performing context-based keyword searching, in accordance with various embodiments.

FIG. 1 depicts a diagram of an example of an environment 100 for performing context-based keyword searching using a single search bar, in accordance with various embodiments. As shown in FIG. 1, the example environment 100 can include at least one computing system 102 that includes one or more processors 104 and memory 106. The memory 106 may be non-transitory and computer-readable. The memory 106 may store instructions that, when executed by the one or more processors 104, cause the one or more processors 104 to perform various operations described herein. For example, memory 106 may store instructions for context-based keyword search engine 200 that, when executed by the one or more processors 104, cause the one or more processors 104 to perform various operations described with respect to FIG. 2. The environment 100 may also include a computing device 110 that is able to communicate with the system 102 (e.g., over one or more computer networks) and a data store 108 that is accessible to the system 102.

In some embodiments, the system 102 and the computing device 110 may be integrated in a single device or system. Alternatively, the system 102 and the computing device 110 may be individual computing devices. For example, the computing device 110 may be a mobile device and the system 102 may be a computing server. The data store 108 may be accessible to the system 102, for example, through the memory 106, another device coupled to the system 102, cloud-based storage, etc. Various operations that are capable of being performed by the system 102 are described below in reference to FIGS. 2-4.

Figure 2:
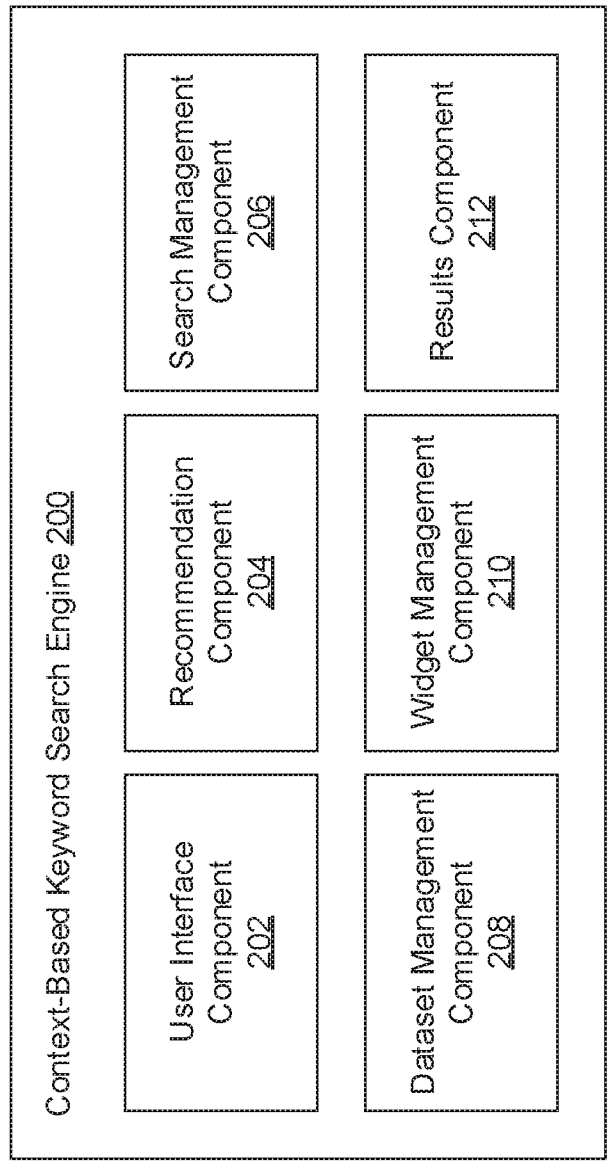
FIG. 2 depicts a diagram of an example of a context-based keyword search engine, in accordance with various embodiments.

FIG. 2 depicts a diagram of an example of a context-based keyword search engine 200, in accordance with various embodiments. In various embodiments, functionality of the context-based keyword search engine 200 may be performed by one or more servers, workstations, desktop computers, laptop computers, mobile devices, and/or other computing devices. In some embodiments, functionality of the context-based keyword search engine 200 may be performed by computing system 102. For example, the components of context-based keyword search engine 200 may comprise computer-readable instructions executable by processors 104. The components of context-based keyword search engine 200 may comprise user interface component 202, recommendation component 204, search management component 206, dataset management component 208, widget management component 210, results component 212, and/or other computer program components. As used herein, for convenience, the various components of context-based keyword search engine 200 will be described as performing an operation, when, in fact, the various components comprise instructions which may program the processors 104 (and therefore computing system 102) to perform the operation.

User interface component 202 may be configured to generate a user interface through which the context-based keyword searching is facilitated. In various implementations, the user interface may comprise a single search bar configured to facilitate context-based keyword searching. In various implementations, user interface component 202 may be configured to cause the user interface to be provided to a user through a display screen of system 102 and/or computing device 110. In some implementations, the user interface may be provided by a software application running on system 102 and/or computing device 110. In some implementations, user interface component 202 may generate a user interface depicted in FIGS. 3A-3C and cause the user interface depicted in FIGS. 3A-3C to be provided to the user.

In various implementations, user interface component 202 may be configured to generate and provide a user interface comprising a search bar, a selectable search button, indications of one or more searchable datasets, and/or one or more other components for facilitating context-based keyword searching. In some implementations, user interface component 202 may be configured to generate a provide a user interface with a single search bar. In some implementations, user interface component 202 may be configured to generate a provide a user interface with multiple search bars. For example, and referring to FIG. 3A, exemplary interface 300 is depicted. Exemplary interface 300 may comprise search bar 302, selectable search button 304, and indications of one or more searchable datasets 306.

In various implementations, user interface component 202 may be configured to receive input provided by a user. In various implementations, the user input may comprise textual input provided by a user. For example, the textual input may comprise a keyword, a phrase, a date, a string of numbers, a string of letters, an alphanumeric string, and/or one or more other forms of text-based input. In various implementations, user interface component 202 may be configured to receive user input via a search bar provided via the user interface. For example, and referring to FIG. 3A, user input may be received via search bar 302. In an exemplary interface, textual input comprising "John Doe" may be received by search bar 302.

Recommendation component 204 may be configured to identify suggested search parameters to apply to a search based on textual input provided by a user. In various implementations, recommendation component 204 may be configured to identify suggested search parameters to apply to individual portions of a user input. For example, a user input may comprise multiple keywords, phrases, and/or numbers, each associated with a different parameter of a search. In some implementations, recommendation component 204 may be configured to dynamically identify suggested search parameters as user input is received via a search bar of a user interface. For example, as a user begins to provide textual input identifying a parameter of a search, recommendation component 204 may be configured to identify suggested search parameters for that textual input. As additional characters are entered, recommendation component 204 may be configured to update the suggested search parameters and/or identify additional suggested search parameters in real-time.

In various implementations, recommendation component 204 may be configured to determine the probabilities of multiple potential search terms based on the textual input. For example, based on a textual input, recommendation component 204 may be configured to determine the probability the textual input is related to a name, the probability the textual input is related to a date, the probability the textual input is related to an address, and/or the probability the textual input is related to one or more other types of data. Based on the determined probabilities, recommendation component 204 may be configured to identify a set of suggested search parameters to apply to a search based on a given textual input or search term. In some implementations, recommendation component 204 may be configured to rank the suggested search parameters based on the determined probabilities.

In various implementations, recommendation component 204 may be configured to cause a list of the suggested search parameters identified to be provided to the user via the user interface. For example, recommendation component 204 may be configured to cause a list of the suggested search parameters identified to be provided to user interface component 202 in real-time. In various implementations, user interface component 202 may be configured to provide the list of the suggested search parameters identified to the user via the user interface. For example, user interface component 202 may be configured to provide the suggested search parameters identified to be provided in a drop-down menu associated with the search bar. In some implementations, the suggested search parameters may be included in the drop-down menu based on their rank. Therefore, suggested search parameters may be depicted with the search parameter with the highest probability appearing first. The drop-down menu may be selectable (e.g., each of the suggested search parameters may be selectable). In other words, as user input is received via the search bar, suggested search parameters to associate with the user input entered are identified and provided to the user in a drop-down menu associated with the search bar.

Figure 3A:
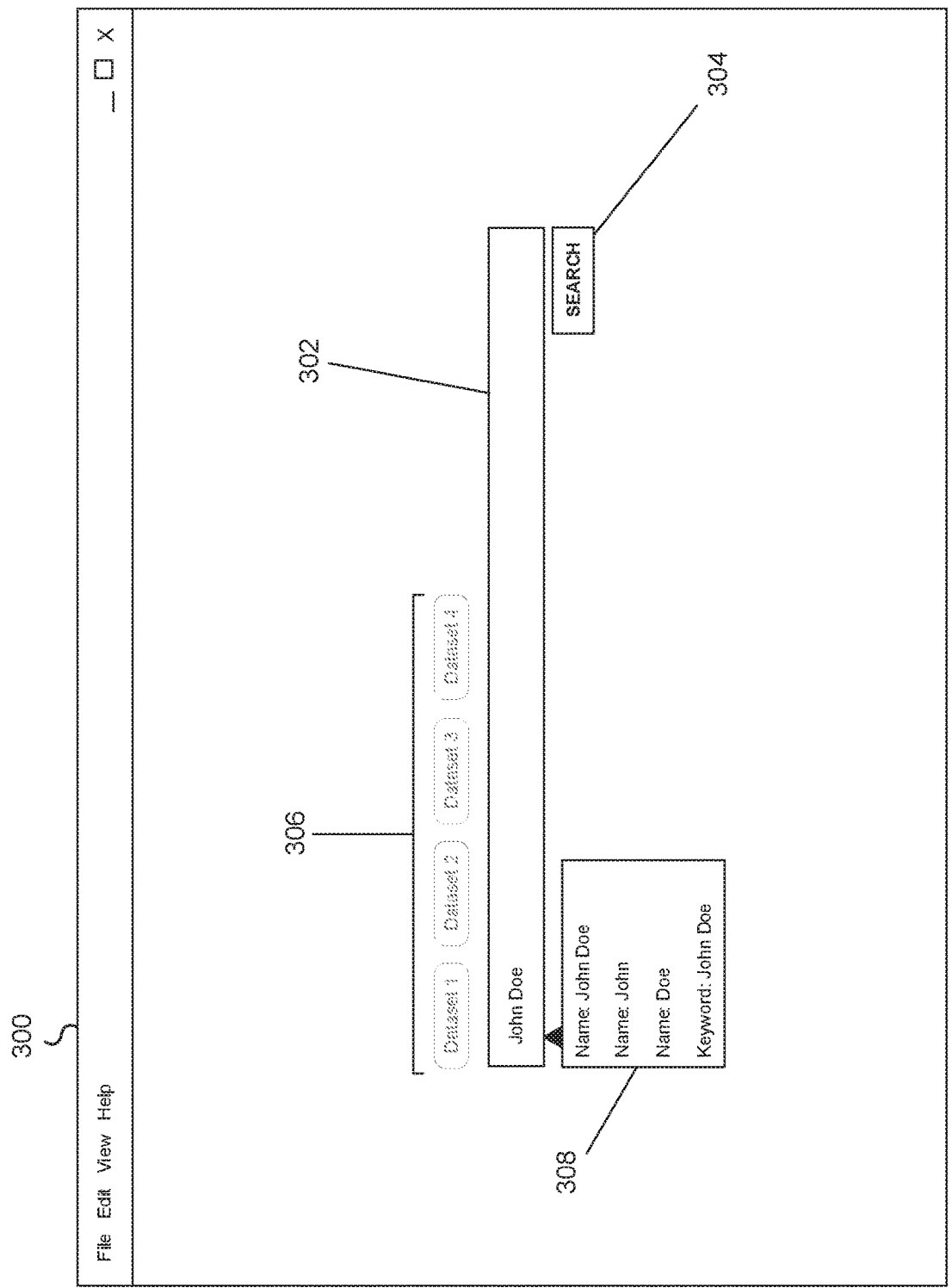
FIG. 3A-3C depict exemplary interfaces presented to a user for conducting context-based keyword searching, in accordance with various embodiments.

For example, and referring to FIG. 3A, textual input comprising "John Doe" may be received via search bar 302. Based on the textual input comprising "John Doe," recommendation component 204 may be configured to identify suggested search parameters to associate with the textual input "John Doe." For example, the suggested search parameters identified may comprise searching for the name "John Doe," the name "John," the name "Doe," or the keyword "John Doe." User interface component 202 may provide a visual representation of the list of suggested search parameters via drop-down menu 308. For example, user interface component may be configured to generate a visual representation of the list of suggested search parameters to be provided to the user. In some implementations, the list of suggested search parameters may always include a "keyword" search parameter. A "keyword" search parameter may comprise a search parameter in which neither a particular type of data nor a filter is associated with the search term. In other words, when a keyword search parameter is associated with a given search term, the search of that search term is performed as a generic keyword search.

In various implementations, each suggested search parameter may each include a type of data to associate with the search term. For example, the types of data that may be associated with a search term may comprise a name, a date, a date of birth (DOB), a phone number, a social security number (SSN), an address, a city, a state, a zip code, an employee identifier, a location identifier, a part number, a part type, and/or one or more other types of data. The types of data may be based on the types of data of one or more datasets searchable by context-based keyword search engine 200. For example, datasets identifying individuals may include for each data entry one or more of a name, DOB, phone number, SSN, address, and/or other types of data suitable for identifying the individuals.

In various implementations, each suggested search parameter may include a filter to associate with the search term. The filters may comprise object-type filters. For example, the filters that may be applied to a search may comprise a person, object, place, and/or other filter to apply to the search based on the search term. The filters may be based on filters associated with one or more datasets searchable by context-based keyword search engine 200.

In various implementations, recommendation component 204 may be configured to identify suggested search parameters to apply to a search based on a list of possible types of data or filters. In some implementations, recommendation component 204 may be configured to obtain the list of types of data or filters from memory 106 and/or data store 108. The list of types of data or filters may be predefined and/or modified by an administrative user and/or one or more other users associated with system 102. In some implementations, the list of types of data or filters may be based on dataset information managed by dataset management component 208 and stored in memory 106 and/or data store 108. For example, dataset information for a dataset may identify one or more types of data in the dataset and/or filters associated with the dataset. In some implementations, recommendation component 204 may be configured to obtain the dataset information from memory 106 and/or data store 108. In some implementations, user interface component 202 may be configured to provide a visual representation of the list of possible types of data or filters to the user. As such, the user may select from the list of possible types of data or filters to associate at least one of the types of data or filters with a search if an intended search parameter is not identified by recommendation component 204 and/or provided by user interface component 202 via a drop-down menu.

In various implementations, recommendation component 204 may be configured to identify suggested search parameters for user input based on a preliminary search of one or more datasets. For example, recommendation component 204 may be configured to cause one or more datasets searchable by context-based keyword search engine 200 to be searched based on user input received via a search bar. In some implementations, one or more datasets searchable by context-based keyword search engine 200 may be associated with one or more predefined types of data. For example, a database comprising U.S. Census data may comprise a list of individual persons, and may therefore be associated with predefined types of data such as "name," "DOB," "address," and/or one or more other types of data related to individual persons.

In an exemplary implementation, a first dataset may be associated with a first type of data and a second dataset may be associated with a second type of data. In the foregoing exemplary implementation, recommendation component 204 may be configured to cause a preliminary search of a search term to be performed in the first dataset and the second dataset. Based on a determination that the search term is found in the first dataset, recommendation component 204 may be configured to cause at least a first search parameter in which the first type of data is associated with the search term to be included in the one or more suggested search parameters. Based on a determination that the search term is not found in the second dataset, recommendation component 204 may be configured to not include a second search parameter in which the second type of data is associated with the search term in the one or more suggested search parameters.

In various implementations, recommendation component 204 may be configured to identify suggested search parameters for user input based on a record of one or more previous searches performed. For example, recommendation component 204 may be configured to identify suggested search parameters for user input provided by a particular user based on a record of one or more previous searches performed by that particular user and/or one or more other users. In some implementations, recommendation component 204 may be configured to obtain a record of one or more previous searches performed by that particular user and/or one or more other users from search management component 206. In some implementations, recommendation component 204 may be configured to compare a search term received via a search bar with a record of one or more previous searches performed. Based on a determination that the search term is found in the record of one or more previous searches performed, recommendation component 204 may be configured to cause one or more search parameters to be included in the one or more suggested search parameters based on one or more search parameters, types of data, and/or filters associated with the search term in the one or more previous searches performed.

In various implementations, recommendation component 204 may be configured to identify suggested search parameters for a search term based on one or more other search terms of the search, one or more search parameters associated with one or more other search terms of the search, and/or one or more suggested search parameters identified for one or more other search terms of the search. As such, during the construction of a search, recommendation component 204 may be configured to build on prior search terms and/or search parameters entered. For example, recommendation component 204 may be configured to identify date of birth as a suggested search parameter instead of a generic date and/or identify social security number as a suggested search parameter instead of employee identification number, each based on a prior search parameter identified as a name. Recommendation component 204 may be configured to identify date of birth as a suggested search parameter instead of a generic date based on stored knowledge that a date of birth follows a name more often than a generic date. Recommendation component 204 may be configured to identify social security number as a suggested search parameter instead of employee identification number based on stored knowledge that a social security number follows a name more often than an employee identification number.

In various implementations, multiple search parameters may be included in a single search. As a user enters a search term and selects one of the one or more suggested search parameters provided via a user interface comprising the search bar, a suggested search parameter may replace the search term entered. For example, and referring to FIG. 3B, exemplary interface 300 may comprise at least search bar 302, selectable search button 304, indications of one or more searchable datasets 306, and indication of first search parameter 310. First search parameter 310 may comprise a search parameter selected for the textual input comprising "John Doe." In FIG. 3B, additional textual input comprising "Pers" may be received via search bar 302. Based on the textual input comprising "Pers," recommendation component 204 may be configured to identify suggested search parameters to associate with the textual input "Pers." For example, the suggested search parameters identified may comprise searching with the filter "Person" or for the keyword "Pers." As such, suggested search parameters associated with the word "Person" may be identified without the user having to enter the entirety of the word. Exemplary interface 300 may comprise a visual representation of the list of suggested search parameters via drop-down menu 312.

Figure 3B:
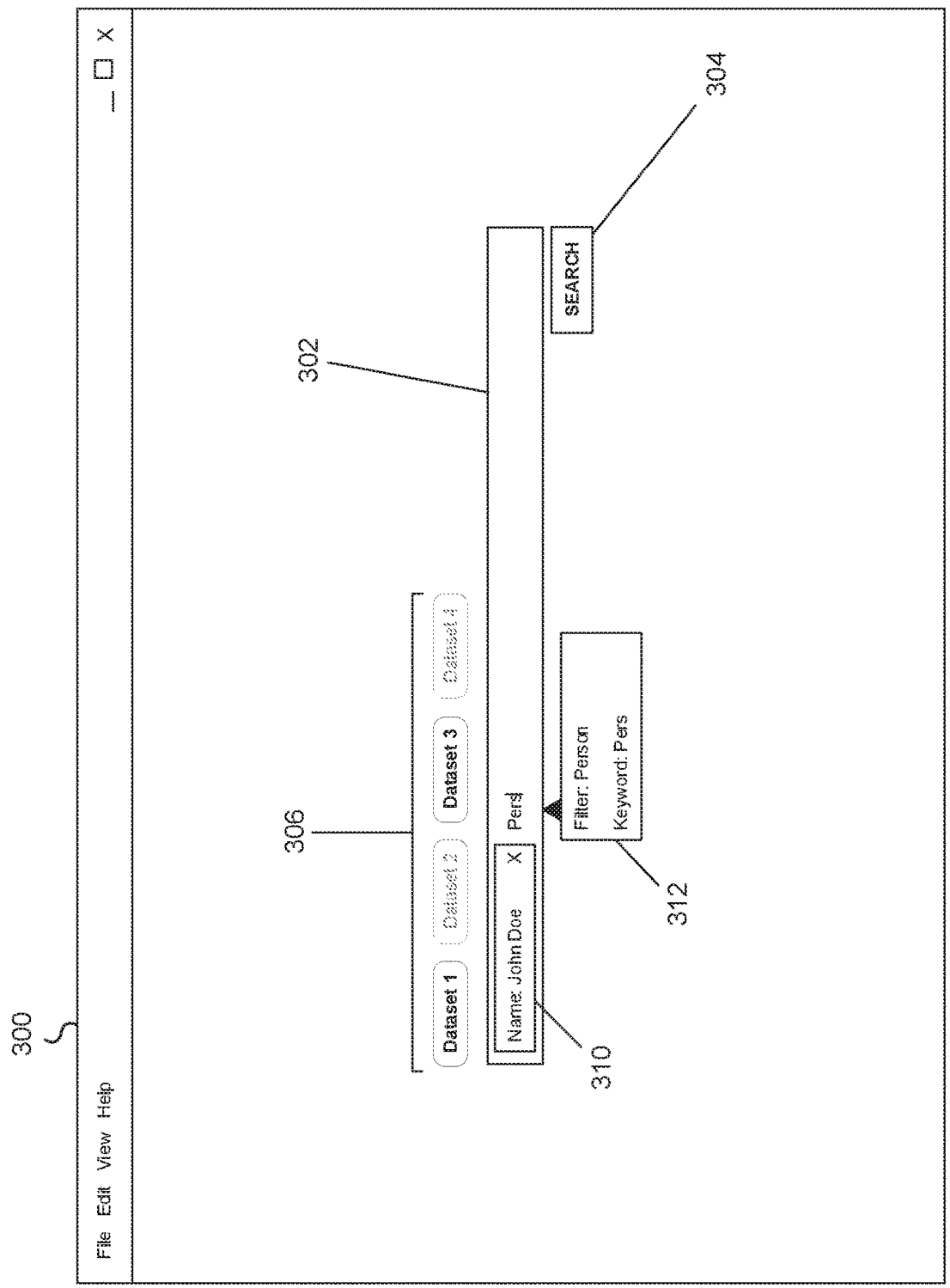

In various implementations, recommendation component 204 may be configured to identify suggested search parameters for a search term associated with a given search based on the search term and one or more other search terms and/or search parameters of that search. Referring to FIG. 3B, recommendation component 204 may be configured to identify suggested search parameters to associate with the textual input "Pers" based on the textual input "Pers" and first search parameter 310. For example, recommendation component 204 may be configured to identify the filter "Person" as a suggested search parameter based on first search parameter 310, which comprises the name "John Doe." In other words, based on first search parameter 310 comprising a name-based search parameter for the search term "John Doe," recommendation component 204 may be configured identify a "person" object-type filter for the search term "Pers."

In various implementations, recommendation component 204 may be configured to identify suggested search parameters for user input based on requirements associated with one or more datasets searchable by context-based keyword search engine 200. For example, recommendation component 204 may be configured to obtain dataset information associated with at least one dataset from dataset management component 208. The dataset information for a given dataset may indicate at least one or more types of data required to perform a search in that dataset. For example, a dataset may require that a name, DOB, and address must be included in order to search the dataset. In the foregoing example, the dataset information may indicate that a search parameter for each of name, DOB, and address must be represented in the search bar in order to perform a search of that dataset. In some implementations, recommendation component 204 may be configured to identify suggested search parameters for a search term by comparing search parameters already entered in a search bar to requirements of one or more datasets searchable by context-based keyword search engine 200. For example, recommendation component 204 may be configured to determine that a search parameter representing name is already represented in the search bar based on first search parameter 310, and identify suggested search parameters for subsequently entered search term based on a determination that search parameters for DOB and address are not represented in the search bar.

In various implementations, recommendation component 204 may be configured to identify suggested search parameters for user input based on the format of user input received via the search bar. In various implementations, certain formats may be associated with predefined types of data. For example, a string of numbers separated by slashes (e.g., 01/01/1990) is more likely to comprise a date than a phone number, a string of nine letters separated by dashes is more likely to comprise a social security number than a business identifier, and a string of ten letters separated by dashes is more likely to comprise a phone number than a date. Recommendation component 204 may be configured to identify suggested search parameters for search terms based on the format of the search term as entered in the search bar and/or on stored probabilities associated with different formats.

Search management component 206 may be configured to manage a search performed via a search bar. In various implementations, search management component 206 may be configured to generate a search based on one or more search parameters. For example, search management component 206 may be configured to replace each search term entered with one or more search parameters. In some implementations, search management component 206 may be configured to replace a search term with a particular search parameter based on user input. For example, search management component 206 may be configured to replace a search term with one of one or more suggested search parameters identified and provided in a drop-down menu associated with the search term based on a user selection of the search parameter in the drop-down menu. In some implementations, search management component 206 may be configured to automatically replace a search term with a particular search parameter. For example, search management component 206 may be configured to determine that no suggested search parameters have been identified for a given search term and automatically replace the search term with a keyword search parameter associated with the search term. In some implementations, search management component 206 may be configured to automatically replace a search term with the highest ranked suggested search parameter. In some implementations, search management component 206 may be configured to automatically replace a search term based on one or more user-specific settings indicating that certain search terms should automatically be replaced by certain search parameters.

In various implementations, search management component 206 may be configured to maintain a record of searches performed. For example, search management component 206 may be configured to generate and update a record of one or more searches performed by that particular user and/or one or more other users. The record of the one or more searches performed may comprise an indication of search terms entered, search parameters associated with individual search terms (including types of data and/or filters associated with individual search terms), search results associated with particular search terms entered and/or search parameters associated with the individual search terms entered, and/or other information associated with one or more prior searches.

In various implementations, indications of searchable datasets may be provided to the user. For example, and referring to FIG. 3B, exemplary interface 300 includes indications of one or more searchable datasets 306. Based on a comparison of search parameters already entered in a search bar to requirements of one or more datasets searchable by context-based keyword search engine 200, search management component may be configured to determine whether the requirements of one or more datasets have been satisfied by the search parameters already entered in the search bar. Referring to FIG. 3B, indications of one or more searchable datasets 306 indicate that Dataset 1 and Dataset 3 are searchable based on the determination that the requirements of Dataset 1 and Dataset 3 have been satisfied by the search parameters already entered in the search bar, and that Dataset 2 and Dataset 4 are not searchable based on the determination that the requirements of Dataset 2 and Dataset 4 have not been satisfied by the search parameters already entered in the search bar. In various implementations, user interface component 202 may be configured to cause indications of searchable datasets to be provided via a user interface comprising the search bar. The indications of selectable datasets provided via the user interface may enable users to select datasets to add to a search and/or select datasets to remove from a search. For example, the indications of searchable datasets may comprise a selectable icon for each searchable dataset enabling a user to add the dataset to a search and/or remove the dataset from a search.

In various implementations, search management component 206 may be configured to identify a format associated with user input provided. For example, search management component 206 may be configured to identify a format associated with a search term entered via the search bar. As discussed above, certain formats may be associated with predefined types of data. For example, a string of numbers separated by slashes (e.g., 01/01/1990) is more likely to comprise a date than a phone number, a string of nine letters separated by dashes is more likely to comprise a social security number than a business identifier, and a string of ten letters separated by dashes is more likely to comprise a phone number than a date. In some implementations, search management component 206 may be configured to determine the most likely intended format for a search term based on a comparison of the format of the search term and predefined formats associated with one or more types of data. In some implementations, search management component 206 may be configured to perform natural language processing on a search term to identify one or more words or phrases intended by the search term. For example, search management component 206 may be configured to determine perform natural language processing on a search term to determine that the search term relates to an address.

In various implementations, search management component 206 may be configured to modify a format of a search term based on an intended format identified for the search term. For example, search management component 206 may be configured to determine that a string of numbers refers to a social security number based on the user input comprises nine numbers and one or more other factors. Based on the determination that the string of numbers refers to a social security number, search management component 206 may be configured to modify the search term to appear based on a predefined format associated with social security numbers (e.g., 123-45-6789). In some implementations, search management component 206 may be configured to modify a search term based on a search parameter identified and associated with the search term. For example, based on an indication that the user has selected a date associated with a search term, search management component 206 may be configured to modify the date to appear in a predefined format associated with dates. In various implementations, search management component 206 may be configured to modify a search term to appear in a format required by one or more datasets for the type of data of the search term. For example, upon determining that a search term relates to an address, search management component 206 may be configured to geocode the search term. In some implementations, search management component 206 may be configured to translate the search term related to an address to a format for geographically definable information required by one or more datasets. For example, each dataset may require geographically definable locations to be defined by an address, GPS coordinates, a point and radius, and/or one or more other formats for defining geographically definable locations.

In various implementations, search management component 206 may be configured to run a search in one or more datasets based one or more search parameters. In various implementations, search management component 206 may be configured to run a search in response to user input indicating a request to run a search. For example, search management component 206 may be configured to run a search in response to user selection of a selectable search button (e.g., selectable search button 304). In various implementations, search management component 206 may be configured to run a search in all datasets based on the one or more search parameters. In some implementations, search management component 206 may be configured to run a search in all datasets searchable based on the one or more search parameters. For example, search management component 206 may not search one or more datasets for which the required search parameters are not represented by the search parameters. In various implementations, search management component 206 may be configured to limit a search to selected databases and/or selected datasets. In some implementations, search management component 206 may be configured to limit a search to one or more databases and/or one or more datasets identified by a user. For example, search management component 206 may be configured to limit a search to one or more databases and/or one or more datasets based on a selection and/or deselection of indications of one or more searchable datasets provided in the user interface comprising the search bar.

Dataset management component 208 may be configured to manage one or more data sources to be searched. In various implementations, dataset management component 208 may be configured to obtain access to one or more data sources. For example, the one or more data sources may comprise one or more datasets, one or more databases each comprising multiple datasets, and/or one or more other types of data sources. In various implementations, dataset management component 208 may be configured to maintain dataset information associated with the one or more data sources. Dataset information may identify one or more types of data in a dataset and/or filters associated with the dataset, and/or one or more types of data required to perform a search in that dataset.

Widget management component 210 may be configured to provide one or more widgets configured to receive user input identifying a search term. For example, the one or more widgets may comprise a calendar widget, a map widget, and/or one or more other widgets able to receive user input identifying or clarifying a search term. In various implementations, widget management component 210 may be configured to generate a widget to be provided via the user interface based on a search term. In various implementations, widget management component 210 may be configured to cause a widget to be provided via the user interface based on a search term. In some implementations, widget management component 210 may be configured to cause a widget to be provided via the user interface based on the format of a search term.

In some implementations, search management component 206 may be configured to determine that a search term is likely a date based on the format of the search term. Based on the determination that the search term is likely a date, widget management component 210 may be configured to cause a calendar widget to be provided in association with the search bar and the search term. In various implementations, the calendar widget may depict a date or date range associated with the search term and/or enable a user to identify a date or date range via the calendar widget.

Figure 3C:
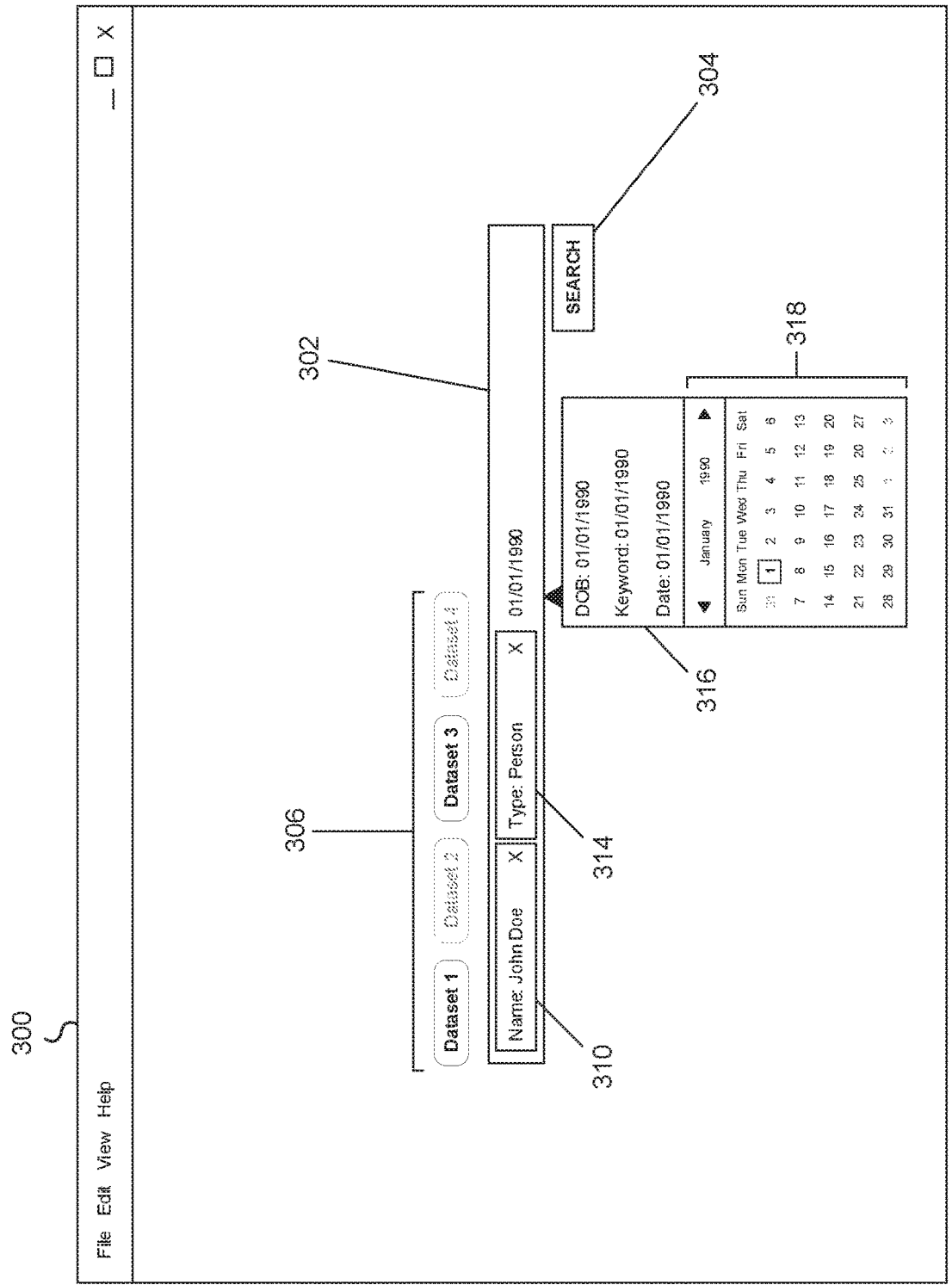

For example, and referring to FIG. 3C, exemplary interface 300 may comprise at least a search bar 302, selectable search button 304, indications of one or more searchable datasets 306, indication of first search parameter 310, indication of second search parameter. Second search parameter 314 may comprise a search parameter selected for the textual input comprising "Pers." In FIG. 3C, additional textual input comprising "01/01/1990" may be received via search bar 302. Based on the textual input comprising "01/01/1990," recommendation component 204 may be configured to identify suggested search parameters to associate with the textual input "01/01/1990." For example, the suggested search parameters identified may comprise searching with the date of birth "01/01/1990," the keyword "01/01/1990," or the date "01/01/1990." Exemplary interface 300 interface may include a visual representation of the list of suggested search parameters via drop-down menu 316. Upon determining that the textual input comprising "01/01/1990" likely comprises a date, widget management component 210 may be configured to cause a calendar widget to be provided. Based on the determination that the textual input comprising "01/01/1990" likely comprises a date, exemplary interface 300 may comprise calendar widget 318.

In some implementations, search management component 206 may be configured to determine that a search term is likely an address based on the format of the search term. Based on the determination that the search term is likely an address, widget management component 210 may be configured to cause a map widget to be provided in association with the search bar and the search term. In various implementations, the map widget may depict a location associated with the search term and/or enable a user to identify a location via the map widget. For example, the location associated with the search term may be provided as a point depicted on the map of the map widget. The map widget may be configured to enable the user to move the point on the map and identify the location of the point based on the user input moving the point on the map. Based on the modified location, widget management component 210 may be configured to communicate with search management component 206 to cause the search term to be modified based on the modified location.

Results component 212 may be configured to cause a visual representation of search results to be provided to a user via the user interface. In various implementations, results component 212 may be configured to determine an appropriate arrangement of the search results to be provided to the user. For example, results component 212 may be configured to determine an appropriate arrangement of search results generated by search management component 206 based on the search parameters of the search.

Example Flowcharts of Process

Figure 4:
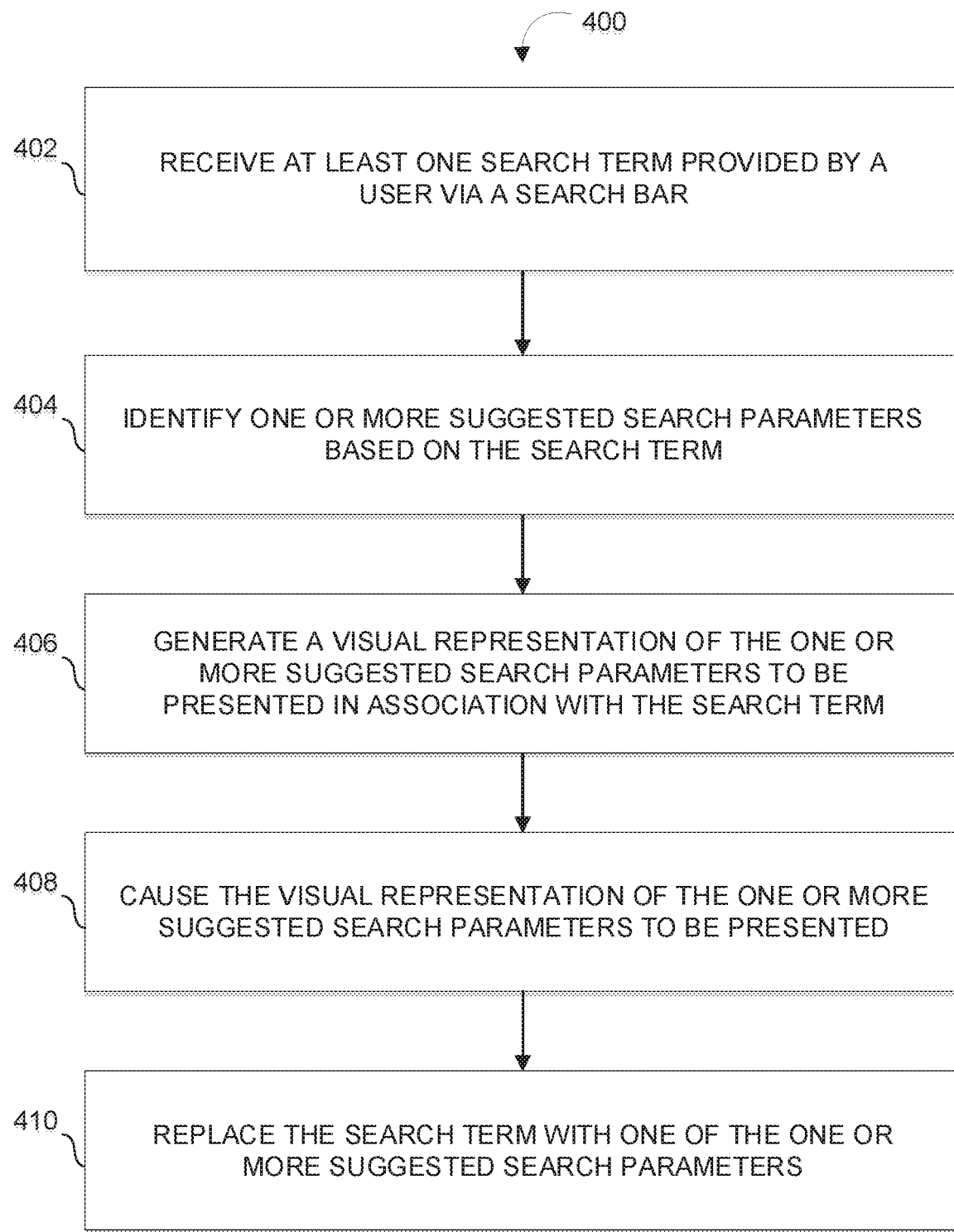
FIG. 4 depicts a flowchart of an example method for providing context-based keyword searching, in accordance with various embodiments.

FIG. 4 depicts a flowchart of an example method 400 for providing context-based keyword searching, in accordance with various embodiments. The operations of method 400 presented below are intended to be illustrative and, as such, should not be viewed as limiting. In some implementations, method 400 may be accomplished with one or more additional operations not described, and/or without one or more of the operations discussed. In some implementations, two or more of the operations may occur substantially simultaneously. The described operations may be accomplished using some or all of the system components described herein.

In an operation 402, method 400 may include receiving at least one search term provided by a user via a search bar. In various implementations, the context-based keyword searching may be performed using a single search bar provided via a user interface. The search term may be received as user input via the search bar. The user input may comprise textual input provided by a user. For example, the textual input may comprise a keyword, a phrase, a date, a number, an alphanumeric string, and/or one or more other forms of text-based input. In some implementations, operation 402 may be performed by a component the same as or similar to user interface component 202 (shown in FIG. 2 and described herein).

In an operation 404, method 400 may include identifying one or more suggested search parameters based on the search term. In various implementations, the one or more suggested search parameters may include a type of data and/or a filter to associate with the search term. In various implementations, one or more suggested search parameters may be identified based on the search term itself, a list of possible types of data or filters, a preliminary search of one or more datasets, a record of one or more previous searches performed, requirements associated with one or more searchable datasets, the format of user input received via the search bar, and/or one or more other factors. In some implementations, search parameters may build on one another. For example, one or more suggested search parameters may be identified based on one or more other search terms included in the search bar, one or more other search parameters included in the search bar, and/or one or more search parameters suggested for other search terms included in the search bar, whether they were ultimately included or not. In some implementations, operation 404 may be performed by a component the same as or similar to recommendation component 204 (shown in FIG. 2 and described herein).

In an operation 406, method 400 may include generating a visual representation of the one or more suggested search parameters to be presented in association with the search term. In an operation 408, method 400 may include causing the visual representation of the one or more suggested search parameters to be presented in association with the search term. In various implementations, the identified search parameters may be provided via a drop-down menu associated with the search term/search bar. The drop-down menu may be selectable (e.g., each of the suggested search parameters may be selectable). In other words, as user input is received via the search bar, suggested search parameters to associate with the user input entered are identified and provided to the user in a drop-down menu associated with the search bar. In some implementations, operation 406 and operation 408 may be performed by a component the same as or similar to user interface component 202 (shown in FIG. 2 and described herein).

In an operation 410, method 400 may include replacing the search term with one of the one or more suggested search parameters. In various implementations, search terms may be replaced with a search parameter based on user input. For example, a search term may be replaced with one of one or more suggested search parameters identified and provided in a drop-down menu associated with the search term based on a user selection of the search parameter in the drop-down menu. In some implementations, operation 410 may be performed by a component the same as or similar to search management component 206 (shown in FIG. 2 and described herein).

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 5:
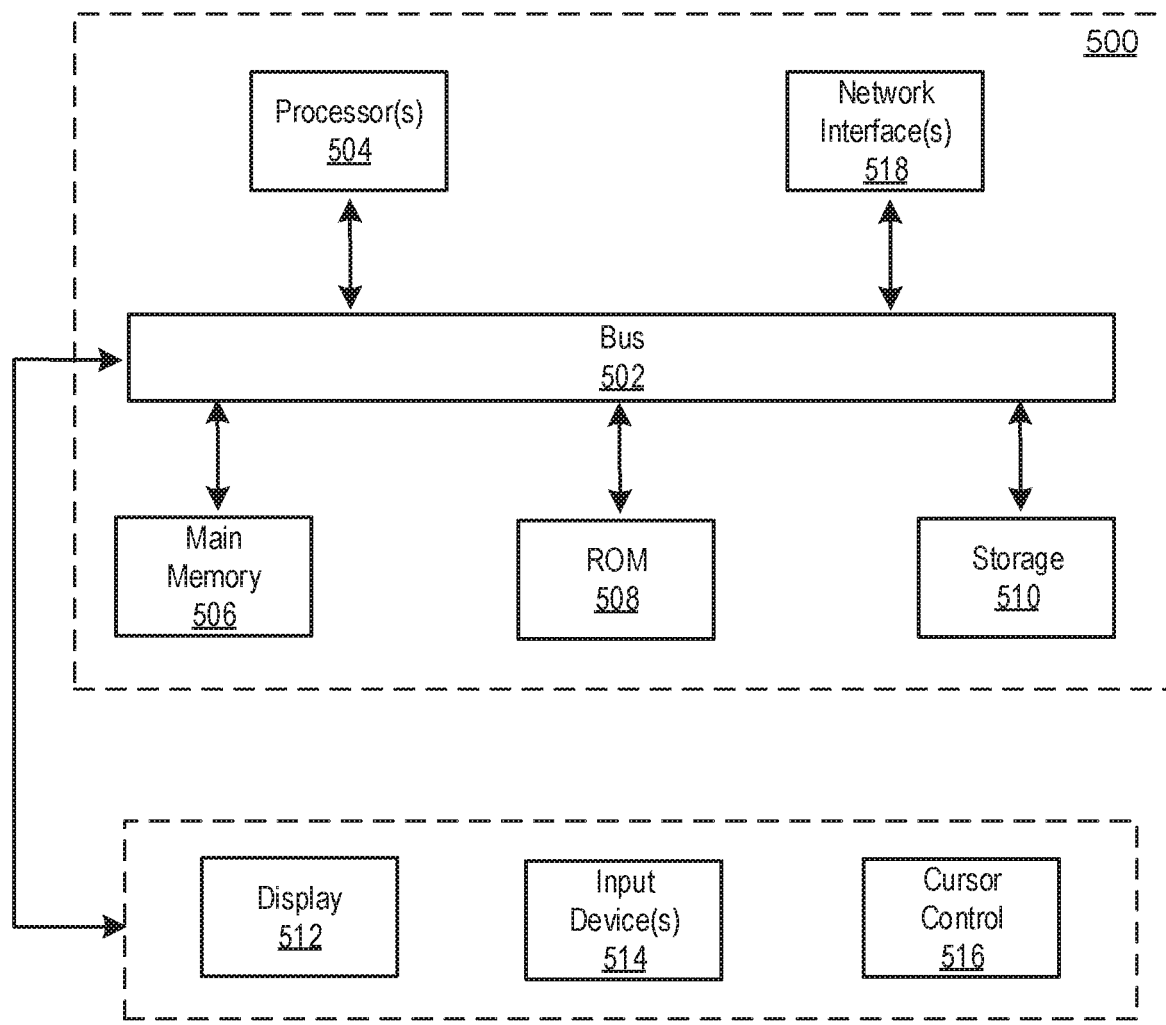
FIG. 5 depicts a block diagram of an example computer system in which any of the embodiments described herein may be implemented.

FIG. 5 depicts a block diagram of an example computer system 500 in which any of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a cathode ray tube (CRT) or LCD display (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C, or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may retrieves and executes the instructions. The instructions received by main memory 506 may optionally be stored on storage device 510 either before or after execution by processor 504.

The computer system 500 also includes a communication interface 518 coupled to bus 502. Communication interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicated with a WAN). Wireless links may also be implemented. In any such implementation, communication interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

Other implementations, uses and advantages of the invention will be apparent to those skilled in the art from consideration of the specification and practice of the invention disclosed herein. The specification should be considered to describe examples only, and the scope of the invention is accordingly intended to be limited only by the following claims.

What is claimed is:

1. A system for context-based keyword search, the system comprising:
   one or more processors; and
   a memory storing instructions that, when executed by the one or more processors, cause the system to:
   receive a first search term provided by a user via a search bar;
   perform a preliminary search of the first search term in each of datasets, wherein the datasets are associated with predefined types of data;
   determine, based on the preliminary search, respective probabilities corresponding to the predefined types of data that the first search term is categorized as according to a data format of the first search term, wherein a higher probability indicates a higher chance that the first search term is categorized as a corresponding predefined type of data;
   identify, based on the respective probabilities, one or more of the predefined types of data having top probabilities:
   determine a plurality of suggested search parameters comprising:
   one or more first classifiers each combined with at least a part of the first search term and
   a second classifier combined with the first search term,
   wherein the one or more first classifiers are respectively corresponding to the one or more of the predefined types of data having top probabilities, and the second classifier instructs performing a search for the first search term in all of the predefined types of data;
   generate a visual representation of the plurality of suggested search parameters;
   receive a user input indicating a selected search parameter from the plurality of suggested search parameters;
   compare the selected search parameter to respective requirements of the datasets, wherein the requirements indicate particular conditions to be satisfied in order for the datasets to be searchable;
   determine that the selected search parameter satisfies first requirements of a first dataset of the datasets;
   determine that the selected search parameter fails to satisfy second requirements of a second dataset of the datasets; and
   generate a visual representation indicating that the first dataset is searchable and the second dataset is not searchable.

2. The system of claim 1, wherein the instructions, when executed, further cause the system to:
   search a first dataset based on the selected search parameter, wherein the first dataset comprises data associated with a predefined type of data and the predefined type of data is associated with a type of data of the first search term.

3. The system of claim 1, wherein the instructions, when executed, further cause the system to:
   obtain a record of previous searches, wherein the record includes previous search terms used in the previous searches and search parameters associated with the previous search terms; and
   compare the first search term to the previous search terms to identify additional suggested search parameters.

4. The system of claim 1, wherein the instructions, when executed, further cause the system to:
   receive a second search term provided by the user via the search bar; and
   identify a second suggested search parameter based on the second search term and the selected search parameter.

5. The system of claim 4, wherein identifying the second suggested search parameter based on the second search term and the selected search parameter comprises:
   obtaining information for a second dataset searchable using the search bar, wherein the information comprises a type of data to perform a search in the second dataset;
   determining that the type of data required to perform the search in the second dataset is not represented by the selected search parameter and the second suggested search parameter; and
   identifying the second suggested search parameter based on the second search term, wherein the second suggested search parameter includes the second search term and replaces the second search term in response to a second user input.

6. The system of claim 4, wherein the instructions, when executed, further cause the system to:
   obtain information for at least one dataset searchable using the search bar, wherein the information comprises a first type of data and a second type of data required to perform a search in the at least one dataset;
   determine that the first type of data and the second type of data required to perform the search in the at least one dataset are represented by the first search term and the second search term; and
   provide an indication in association with the search bar that the search can be performed on the at least one dataset.

7. The system of claim 1, wherein identifying the one or mere plurality of suggested search parameters comprises:
   determining a format of the first search term; and
   identifying a third suggest search parameter based on the format of the first search term.

8. The system of claim 7, wherein the instructions, when executed, further cause the system to:
   generate a widget based on the format of the first search term, wherein the widget relates to the first search term;
   receive a third user input via the widget related to the first search term; and
   modify the third suggested search parameter based on the third user input received via the widget.

9. The system of claim 1, wherein the instructions further cause the system to:
   generate the visual representation including both the first dataset and the second dataset, the first dataset being in an enabled status and the second dataset being in a disabled status.

10. A method for context-based keyword search, the method comprising:
    receiving a first search term provided by a user via a search bar;
    performing a preliminary search of the first search term in each of datasets, wherein the datasets are associated with predefined types of data;
    determining, based on the preliminary search, respective probabilities corresponding to the predefined types of data that the first search term is categorized as according to a data format of the first search term, wherein a higher probability indicates a higher chance that the first search term is categorized as a corresponding predefined type of data;

identifying, based on the respective probabilities, one or more of the predefined types of data having top probabilities;

determining a plurality of suggested search parameters comprising one or more first classifiers each combined with at least a part of the first search term and a second classifier combined with the first search term, wherein the one or more first classifiers are respectively corresponding to the one or more of the predefined types of data having top probabilities, and the second classifier instructs performing a search for the first search term in all of the predefined types of data;

generating a visual representation of the plurality of suggested search parameters;

receiving a user input indicating a selected search parameter from the plurality of suggested search parameters;

comparing the selected search parameter to respective requirements of the datasets, wherein the requirements indicate particular conditions to be satisfied in order for the datasets to be searchable;

determining that the selected search parameter satisfies first requirements of a first dataset of the datasets;

determining that the selected search parameter fails to satisfy second requirements of a second dataset of the datasets; and generating a visual representation indicating that the first dataset is searchable and the second dataset is not searchable.

11. The method of claim 10, further comprising:
searching a first dataset based on the selected search parameter, wherein the first dataset comprises data associated with a predefined type of data and the predefined type of data is associated with a type of data of the first search term.

12. The method of claim 10, wherein the method further comprises:
obtaining a record of previous searches, wherein the record includes previous search terms used in the previous searches and search parameters associated with the previous search terms; and
comparing the first search term to the previous search terms to identify additional suggested search parameters.

13. The method of claim 10, the method further comprising:
receiving a second search term provided by the user via the search bar; and
identifying a second suggested search parameter based on the second search term and the selected search parameter.

14. The method of claim 13, wherein identifying the second suggested search parameter based on the second search term, the second suggest search parameter, and the selected search parameter comprises:
obtaining information for a second dataset searchable using the search bar, wherein the information comprises a type of data to perform a search in the second dataset;
determining that the type of data required to perform the search in the second dataset is not represented by the selected search parameter and the second suggest search parameter; and
identifying the second suggested search parameter based on the second search term, wherein the second suggested search parameter includes the second search term and replaces the second search term in response to a second user input.

15. The method of claim 13, the method further comprising:
obtaining information for at least one dataset searchable using the search bar, wherein the information comprises a first type of data and a second type of data required to perform a search in the at least one dataset;
determining that the first type of data and the second type of data required to perform the search in the at least one dataset are represented by the first search term and the second search term; and
providing an indication in association with the search bar that the search can be performed on the at least one dataset.

16. The method of claim 10, wherein identifying the plurality of suggested search parameters comprises:
determining a format of the first search term; and
identify a third suggest search parameter based on the format of the first search term.

17. The method of claim 16, the method further comprising:
generating a widget based on the format of the first search term, wherein the widget relates to the first search term;
receiving a second user input via the widget related to the first search term; and
modifying the plurality of suggested search parameters based on the second user input received via the widget.

18. The system of claim 1, wherein the system is further caused to:
provide a user interface through a software application running on a computing device operable by the user, wherein the user interface includes the search bar.

19. The system of claim 18, wherein the user interface further includes indications of one or more datasets.

20. A non-transitory memory storing instructions to perform context-based keyword search, wherein the instructions when executed by one or more processors of a computing system, cause the computing system to:
receive a first search term provided by a user via a search bar;
perform a preliminary search of the first search term in each of datasets, wherein the datasets are associated with predefined types of data;
determine, based on the preliminary search, respective probabilities corresponding to the predefined types of data that the first search term is categorized as according to a data format of the first search term, wherein a higher probability indicates a higher chance that the first search term is categorized as a corresponding predefined type of data;
identify, based on the respective probabilities, one or more of the predefined types of data having top probabilities;
determine a plurality of suggested search parameters comprising one or more first classifiers each combined with at least a part of the first search term and a second classifier combined with the first search term, wherein the one or more first classifiers are respectively corresponding to the one or more of the predefined types of data having top probabilities, and the second classifier instructs performing a search for the first search term in all of the predefined types of data;
generate a visual representation of the plurality of suggested search parameters;
receive a user input indicating a selected search parameter from the plurality of suggested search parameters;

compare the selected search parameter to respective requirements of the datasets, wherein the requirements indicate particular conditions to be satisfied in order for the datasets to be searchable;

determine that the selected search parameter satisfies first requirements of a first dataset of the datasets;

determine that the selected search parameter fails to satisfy second requirements of a second dataset of the datasets; and generate a visual representation indicating that the first dataset is searchable and the second dataset is not searchable.

21. The system of claim 1, wherein the instructions further cause the system to:

in response to determining that the first search term belongs to a particular type of data, correcting the first search term to conform to the particular type of data.

* * * * *